US 8,155,869 B2

(12) United States Patent
Nakai

(10) Patent No.: US 8,155,869 B2
(45) Date of Patent: Apr. 10, 2012

(54) NAVIGATION SYSTEM AND METHOD FOR NAVIGATING ROUTE TO DESTINATION

(75) Inventor: Yuki Nakai, Nagoya (JP)

(73) Assignee: DENSO CORPORATION, Kariya (JP)

( * ) Notice: Subject to any disclaimer, the term of this patent is extended or adjusted under 35 U.S.C. 154(b) by 784 days.

(21) Appl. No.: 12/289,111

(22) Filed: Oct. 21, 2008

(65) Prior Publication Data

US 2009/0112458 A1     Apr. 30, 2009

(30) Foreign Application Priority Data

Oct. 30, 2007  (JP) .................................. 2007-281675

(51) Int. Cl.
*G01C 21/00*  (2006.01)
(52) U.S. Cl. ........................................ 701/200; 701/410
(58) Field of Classification Search .................. 700/200; 701/200–226
See application file for complete search history.

(56) References Cited

U.S. PATENT DOCUMENTS

| 5,987,381 A | 11/1999 | Oshizawa | |
| 2001/0025222 A1* | 9/2001 | Bechtolsheim et al. | 701/209 |
| 2005/0222764 A1* | 10/2005 | Uyeki et al. | 701/210 |
| 2008/0021639 A1 | 1/2008 | Inukai | |

FOREIGN PATENT DOCUMENTS

| JP | A-H6-119562 | 4/1994 |
| JP | A-H7-93696 | 4/1995 |
| JP | A-2002-303523 | 10/2002 |
| JP | A-2002-340573 | 11/2002 |
| JP | A-2006-106001 | 4/2006 |
| JP | A-2006-349507 | 12/2006 |

OTHER PUBLICATIONS

Notice of Reason for Refusal mailed Sep. 29, 2009 in corresponding Japanese patent application No. 2007-281675 (and English translation).
Decision for Refusal mailed Jun. 22, 2010 in corresponding Japanese Patent Application No. 2007-281675 (and English translation).

* cited by examiner

*Primary Examiner* — Jeffrey A Smith
*Assistant Examiner* — Resha Desai
(74) *Attorney, Agent, or Firm* — Posz Law Group, PLC

(57) ABSTRACT

A navigation system includes: an information center; a navigation device of a vehicle communicating with the information center; a communication unit transmitting information of a destination to the information center; a center side transmission unit searching positional information of the destination in a database of the information center and transmitting the positional information to the navigation device; a calculation unit of the navigation device calculating a first route to the destination; a navigation side transmission unit transmitting first route calculation result to the information center; and a determination unit of the information center calculating a second route to the destination, comparing second route calculation result with the first route calculation result, and determining whether the navigation device guides a route to the destination based on the first or second route calculation result.

12 Claims, 3 Drawing Sheets

| ZONE | TRAVEL TIME CALC BY NAVI | TRAVEL TIME CALC BY CENTER | SELECTED GUIDANCE |
|---|---|---|---|
| CUR POINT TO PASS POINT 1 | 9 MIN | 10 MIN | NAVI GUIDANCE |
| PASS POINT 1 TO PASS POINT 2 | 8 MIN | 8 MIN | NAVI GUIDANCE |
| PASS POINT 2 TO PASS POINT 3 | 30 MIN | 10 MIN | CENTER GUIDANCE |
| PASS POINT 3 TO PASS POINT 4 | 5 MIN | 4 MIN | NAVI GUIDANCE |
| PASS POINT 4 TO DEST | 5 MIN | 5 MIN | NAVI GUIDANCE |

NAVIGATION SYSTEM AND METHOD FOR NAVIGATING ROUTE TO DESTINATION

CROSS REFERENCE TO RELATED APPLICATION

This application is based on Japanese Patent Application No. 2007-281675 filed on Oct. 30, 2007, the disclosure of which is incorporated herein by reference.

FIELD OF THE INVENTION

The present invention relates to a navigation system and a method for navigating a route to a destination.

BACKGROUND OF THE INVENTION

In an automobile navigation system described in a patent document 1, when a user tells an operator at a communication center, i.e., an information center about a desired destination on a cellular phone or the like, the operator accesses a database to search for the destination, and transmits accurate positional information on the destination to a navigation device in a vehicle. When the navigation device in the vehicle receives the accurate positional information on the destination, the navigation device designates a destination on the basis of the received accurate positional information on the destination, performs route calculation, and executes route guidance.

Moreover, in a patent document 2, when a road leading to a destination is not found because map data is old, road information on a route from a final guided point to the destination is acquired from a communication center, the route from the final guided point to the destination is calculated, and route guidance is executed.

Patent document 1: JP-A-10-253377 corresponding to U.S. Pat. No. 5,987,381

Patent document 2: JP-A-2006-84256 corresponding to US 2008/0021639

In the case of the constitution described in the patent document 1, when map data to be used by the navigation device in a vehicle is old, a road leading to a destination may not be found. In this case, route guidance may not be executed until the vehicle reaches the destination, or a map may demonstrate that a guided place is different from the place of a desired destination. The constitution cannot therefore be said to be user-friendly. Moreover, in the case of the constitution described in the patent document 2, road information on the route from the final guided point to the destination is merely acquired from the communication center. Therefore, even when a new road is constructed in a zone extending from a current location to the final guided point, the new road cannot be designated as a route.

Thus, it is required to provide a navigation system that even when map data to be used by a navigation device in a vehicle is old, can accurately execute route calculation and route guidance for a route from a current location to a destination.

SUMMARY OF THE INVENTION

In view of the above-described problem, it is an object of the present disclosure to provide a navigation system. It is another object of the present disclosure to provide a method for navigating a route to a destination.

According to a first aspect of the present disclosure, a navigation system includes: an information center that is disposed outside of a vehicle; a navigation device that is arranged in the vehicle, and communicates with the information center by data communication; a communication unit that is arranged in the navigation device, and transmits information about a destination to the information center; a center side transmission unit that is arranged in the information center, searches positional information of the destination in a database of the information center, and transmits the positional information to the navigation device; a calculation unit that is arranged in the navigation device, sets the destination based on the positional information input from the information center, and calculates a first route to the destination; a navigation side transmission unit that is arranged in the navigation device, transmits first route calculation result to the information center; and a determination unit that is arranged in the information center, sets the destination based on the positional information, calculates a second route to the destination, compares second route calculation result with the first route calculation result input from the navigation device, and determines whether the navigation device guides a route to the destination based on the first or second route calculation result.

In the above system, an event that the navigation device cannot appropriately execute route guidance because the map data is old can be detected. Consequently, for a route portion for which route guidance cannot be appropriately executed, simple guidance can be executed based on the latest map data available in the information center. Route calculation and route guidance can be extremely appropriately executed for a route from a current location to a destination.

According to a second aspect of the present disclosure, a method for navigating route to a destination includes: transmitting information about the destination from a navigation device in a vehicle to an external information center; calculating a first route from a current position of the vehicle to the destination by the navigation device; transmitting first route calculation result from the navigation device to the information center; calculating a second route from the current position of the vehicle to the destination by a server in the information center; comparing second route calculation result with the first route calculation result by using the server; and determining whether the navigation device guides a route to the destination based on the first or second route calculation result. The first route calculation result includes a first travel time from the current position of the vehicle to the destination. The second route calculation result includes a second travel time from the current position of the vehicle to the destination. The determination unit determines that the navigation device guides the route to the destination based on the second route calculation result when a difference between the first travel time and the second travel time is larger than a predetermined value.

The above method provides appropriate navigation even when the map data in the navigation device is old.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Figure 1:
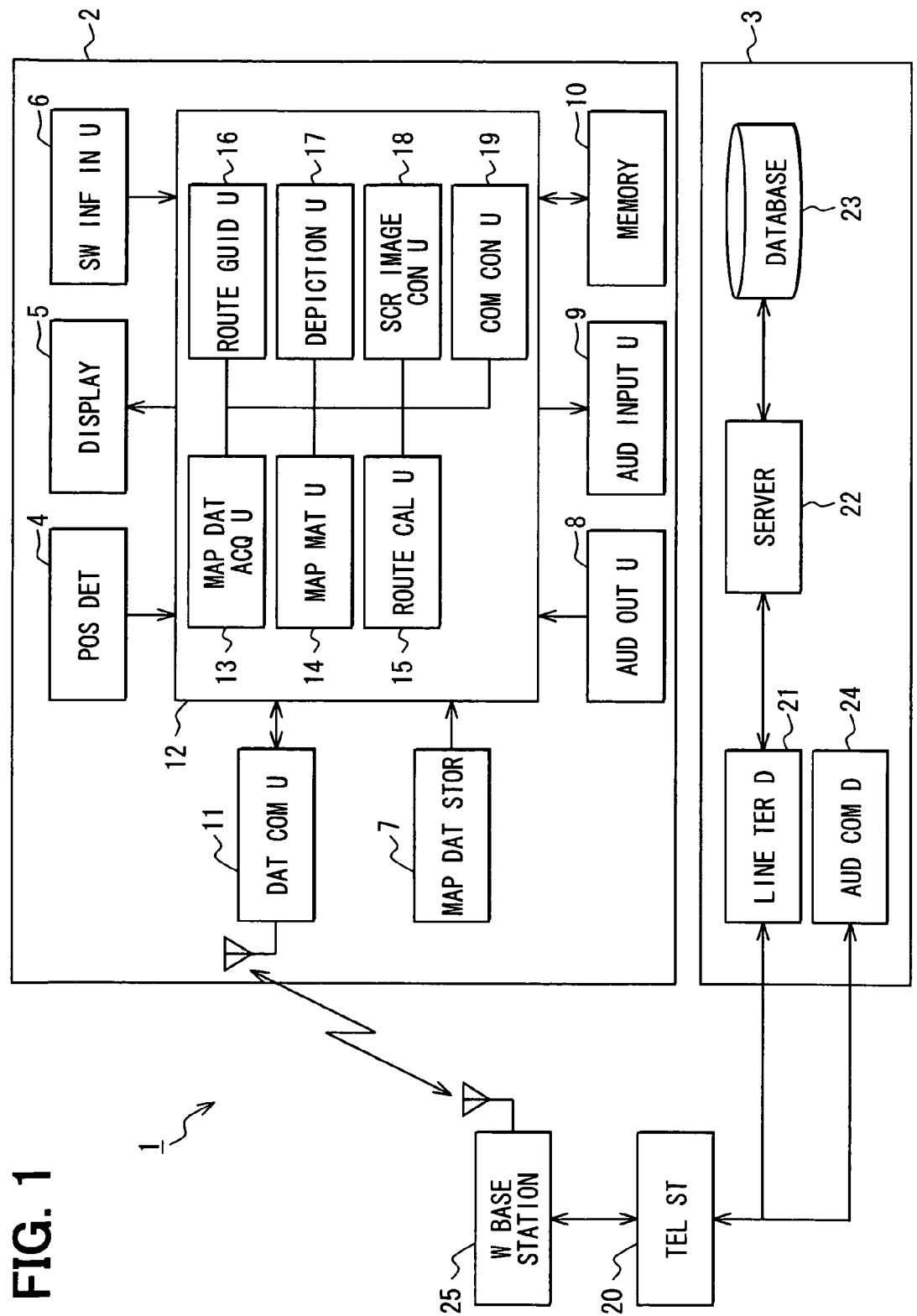
FIG. 1 is a block diagram of a navigation system of an example embodiment.

FIG. 1 is a block diagram showing the outline configuration of a navigation system 1 of an example embodiment. The navigation system 1 includes a navigation device 2 mounted in a vehicle, and an information center 3 that can communicate with the navigation device 2.

The navigation device 2 includes a position detector 4, a display 5, a switch information input unit 6, a map data storage 7, an audio output unit 8, an audio input unit 9, a memory 10, a data communication unit 11, and a controller 12 to which the other pieces of units are connected.

The position detector 4 includes a geomagnetic sensor, a gyroscope, a distance sensor, and a global positioning system (i.e., GPS) receiver which are not shown. The position detector 4 is designed to detect the current position of a vehicle while interpolating data using the sensors, and has a high-precision position detecting ability. When very high precision in position detection is not required, any of the four sensors or a combination of multiple sensors may be used to form the position detector 4. Moreover, a rotation sensor for the steering wheel of the vehicle, a wheel sensor, and a vehicle tilt sensor may be appropriately combined in order to form the position detector 4.

The map data storage 7 is a device that is formed with a reader capable of reading data from a CD-ROM, a DVD-ROM, an HDD, or a memory, and that is to be used to store map data, map matching data, index data, audio recognition dictionary data, and data in a driving rule database. Herein, as for the map data, map matching data, index data, and audio recognition dictionary data, known data items employed in normal car navigation devices can be used.

The switch information input unit 6 includes touch switches or a touch panel formed on the display screen of the display 5 and mechanical push-button switches (not shown) disposed on the perimeter of the display 5. By manipulating the switches of the switch information input unit 6, an instruction (i.e., an operating signal) of instructing operation of any of facilities, for example, facilities for map scale change, menu display selection, destination designation, route search, route guidance initiation, current position correction, display screen image change, volume adjustment, etc., can be given to the controller 12. Moreover, a user or a driver can give the operating signal to the controller 12 via a remote control sensor (not shown) by operating a remote control (not shown) that has a radio communication ability.

When a destination is designated using the switch information input unit 6 or the like, the controller 12 autonomously searches for or calculates an optimal route from a current position detected by the position detector 4 to the destination, designates a guide route, and displays the guide route on the display 5. As the technique of automatically calculating and designating an optimal route, for example, the Dijkstra method is known.

The display 5 is formed with, for example, a color liquid crystal display on which a map is displayed, and is designed so that map data such as road data, character data, and background data, an own vehicle position mark, a guide route, and other appended data items can be displayed while being superposed on one another. In this case, to a displayed map, other information such as a current time instant and traffic jam information as well as a current position and a route (i.e., guide route) can be appended.

The audio output unit 8 is formed with a loudspeaker, and outputs voice, which gives a guide to an institution or various pieces of guidance, on the basis of audio data inputted from the map data storage 7. The audio input unit 9 is formed with, for example, a microphone, and inputs voice uttered by a user, and outputs an electric signal such as audio signal based on the voice to the controller 12. Based on the audio signal, the controller 12 executes the processing of recognizing the user's voice. Consequently, when the user utters voice, the user can operate the navigation device 2. Moreover, the user uses the audio input unit 9 and audio output unit 8 to speak to an operator at the external information center 3 via the controller 12 and data communication unit 11. The audio input unit 9 and audio output unit 8 constitute a communication unit.

The memory 10 is formed with, for example, a ROM and a RAM. A navigation program is stored in the ROM. In the RAM, a work memory area for the program is preserved and map data or the like acquired from the map data storage 3 is temporarily stored.

The data communication unit 11 has an intercommunication ability, is formed with, for example, a portable terminal such as a portable cellular phone or an automobile telephone, and is connected to the controller 12 so that it will be readily attachable or detachable. The data communication unit 11 may be incorporated in the controller 12 for fear it may be readily attachable or detachable.

The controller 12 includes a map data acquisition unit 13, a map matching unit 14, a route calculation unit 15, a route guidance unit 16, a depiction unit 17, a screen image control unit 18, and a communication control unit 19 which are interconnected over a bus. The controller 12 has the capabilities of a calculation unit and a navigation device-side transmission unit respectively.

The map data acquisition unit 13 acquires map data, which is required by the processing units 14, 15, 16, 17, 18, and 19, from the map data storage 7, and provides the map data for the processing units 14, 15, 16, 17, 18, and 19. The pieces of processing to be performed by the processing units 13, 14, 15, 16, 17, 18, and 19 are executed using the ROM or RAM of the memory 10.

The map matching unit 14 uses positional information on the current position of a vehicle, which is detected by the position detector 4, and road shape data, which is contained in map data acquired from the map data storage 7, to identify a road on which the current position is located. In this case, the map data acquisition unit 13 acquires necessary map data from the map data storage 7. After the road is identified, the map data is used to convert the data into a value (i.e., Infralink ID) recognizable by the information center 3, and stores the converted value together with the positional information including information on a mean vehicle velocity and a detection time instant as current positional information in the memory 10.

The route calculation unit 15 calculates or searches for a guide route to a destination on the basis of information on a current position calculated by the map matching unit 14, information on a point of departure designated by a user, and information on a destination which the user designates by displaying a desired map using the switch information input unit 6 or by entering an institution name.

The route guidance unit 16 calculates points, which are required for guidance, using the result of the route calculation, shape data on a road contained in map data, positional information on an intersection, and positional information on a railway crossing, and calculates a required guide of turning to the right or to the left, or the like.

The depiction unit 17 depicts a map of a current position, a rough map of an expressway, or an enlarged diagram of an intersection and its surroundings, which is depicted in the vicinity of the intersection, according to an instruction given by the screen image control unit 18, and displays the depicted map or diagram on the display 5. The screen image control unit 18 instructs the depiction unit 17 to depict display information that should be displayed on the display 5.

The communication control unit 19 instructs the data communication unit 11 to establish an intercommunication-enabled state in response to every instruction a user has entered using the switch information input unit 6 or at regular intervals. Moreover, when the data communication unit 11 receives a request from the information center 3, the intercommunication-enabled state is established. At this time, current position information stored in the memory 10 by the map matching unit 14 is transmitted or posted to the information center 3. Moreover, the controller 12 requests the information center 3 via the data communication unit 11 to send various pieces of information such as traffic jam information, character information, weather information, other car information, institution information, and advertisement information, and thus receives the pieces of information from the information center 3.

On the other hand, the information center 3 includes a line terminal device 21 that performs communication via a telephone station 20, a server 22 that manipulates necessary information such as institution information, point information, route information, personal information, or the like, a database 23 in which necessary data such as map data information, institution information, point information, route calculation information, personal information, or the like is saved, and an audio communication device 24. The information center 3 is connected to a wireless base station 25 via the telephone station 20, and designed to communicate data to the navigation device 2 in a vehicle via the wireless base station 25.

The information center 3 uses the server 22 to manipulate current position information on a vehicle, which is received through communication, and saves the information in the database 23. The information center 3 can communicate with the navigation devices 2 in multiple, i.e., numerous vehicles, and can save the pieces of current position information on multiple vehicles in the database 23. In response to a request for information from the navigation device 2 in a vehicle, the server 22 retrieves necessary information from the database 23, and transmits the retrieved information to the navigation device 2 in the vehicle using the line terminal device 21.

Moreover, the information center 3 includes the audio communication device 24. An operator in the information center can use the audio communication device 24 to speak to a user in a vehicle, who uses the audio output unit 8 and audio input unit 9 of the navigation device 2. In this case, when the user in a vehicle asks the operator in the information center 3 to designate a destination through the communication, the operator uses the server 22 to access the database 23 so as to retrieve institution information, and transmits the point information on the retrieved institution, that is, the point information on the destination to the navigation device 1 in the vehicle via the line terminal device 21. In this case, the server 22 realizes a center-side transmission unit.

Figure 2:
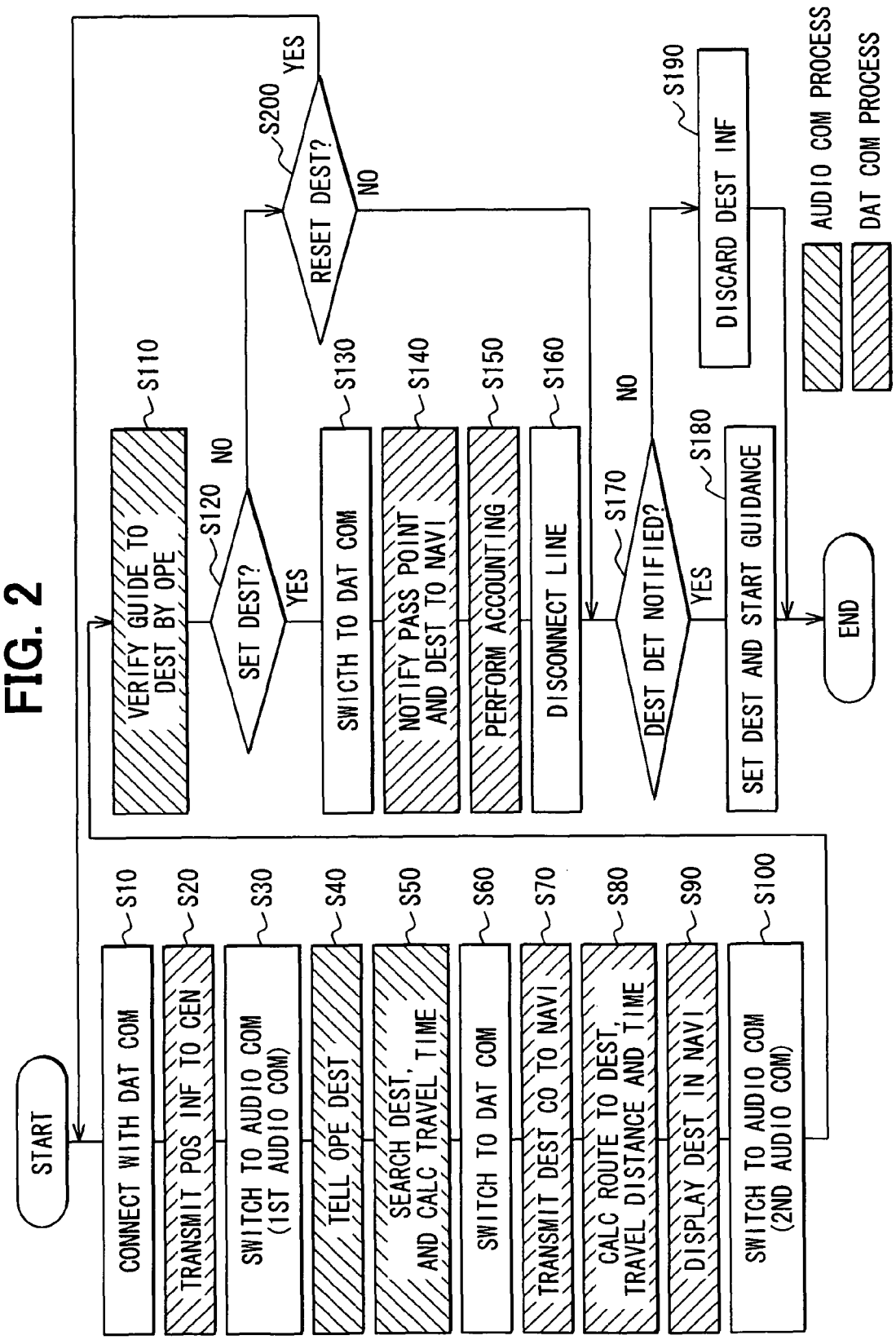
FIG. 2 is a flowchart.

Next, actions to be performed in the foregoing constitution will be described with reference to FIG. 2 and FIG. 3. At step S10 of the flowchart of FIG. 2, the navigation device 2 in a vehicle and the information center 3 are connected to each other in a connection mode for data communication. Thereafter, the procedure proceeds to step S20. Positional information on the current position of the vehicle is transmitted from the navigation device 2 in the vehicle to the information center 3, and stored in the server 22 in the information center 3.

The procedure proceeds to step S30. The connection between the navigation device 2 in the vehicle and the information center 3 is changed, i.e., switched to the connection mode for audio communication between the user of the vehicle and an operator in the information center 3 at a first audio communication. Thereafter, the procedure proceeds to step S40. The user of the vehicle tells the operator in the information center 3 the name of a desired destination, i.e., information for searching for a destination such as an institution name, which the user wants to designate as a destination, through audio communication. Thereafter, the procedure proceeds to step S50. In the information center 3, the operator accesses the database 23, retrieves or searches the position of the desired destination, and stores the positional information, i.e., accurate positional information on the retrieved destination in the server 22. Further, the server 22 calculates a route from the current location of the vehicle to the destination or guide route, and calculates a required time, i.e., a travel time required for driving along the calculated route. In this case, the calculation of the required time is performed for every portion of the route between passing points.

Thereafter, the procedure proceeds to step S60. The connection between the navigation device 2 in the vehicle and the information center 3 is changed, i.e., switched to the connection for data communication. Thereafter, the procedure proceeds to step S70. The positional information, i.e., accurate positional information such as coordinates on the destination is transmitted from the information center 3 to the navigation device 2 in the vehicle. The procedure then proceeds to step S80. The navigation device 2 in the vehicle calculates the route from the current location of the vehicle to the received destination or guide route, and calculates the travel time required for driving along the calculated route. Thereafter, the procedure proceeds to step S90. The navigation device 2 in the vehicle displays the point map of the destination on the display 5 of a navigation screen.

Thereafter, the procedure proceeds to step S100. The connection between the navigation device 2 in the vehicle and the information center 3 is changed to the connection for audio communication between the user of the vehicle and the operator in the information center 3 at a second audio communication. Thereafter, the procedure proceeds to step S110. The operator in the information center 3 decides or verifies whether the user can be appropriately guided to the destination, and asks the user of the vehicle through audio communication whether the destination may be designated as a destination. In this case, for example, when the required time for driving between passing points which is calculated by the navigation device 2 in the vehicle is longer than the required time for driving between passing points, which is calculated at the information center 3, by a set time or more, a decision is made that the user of the vehicle cannot be appropriately guided to the destination.

Figures 3, 4:
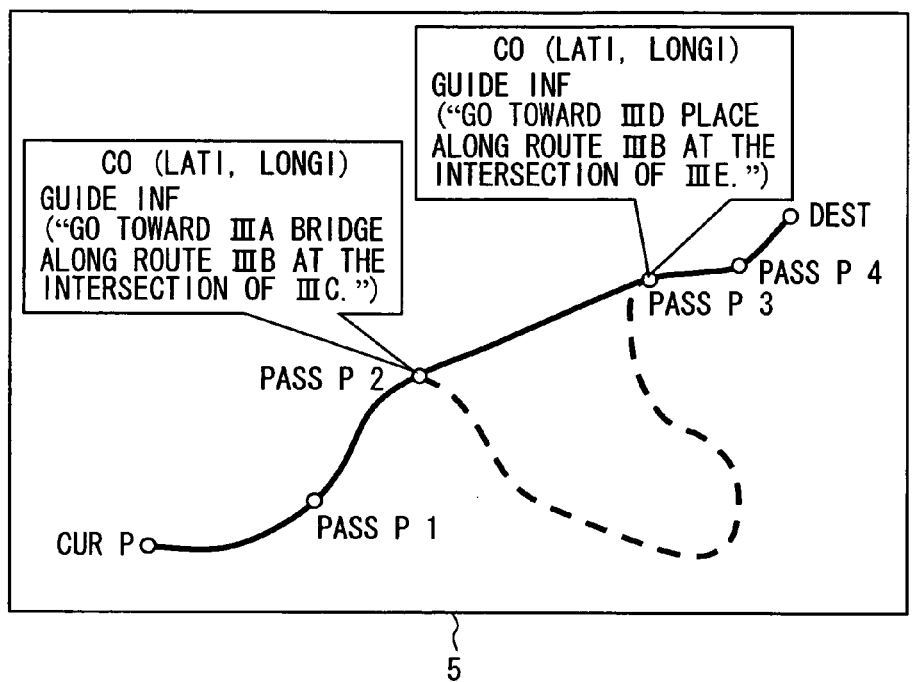
FIG. 3 is an explanatory diagram concerning a guide route and simple guidance.
FIG. 4 is a chart showing a travel time calculated by a navigation device and a center system.

To be more specific, assume that a route shown in FIG. 3 is calculated. In this case, as for the route between the current location and a passing point 2 and the route between a passing point 3 to the destination, the result of route calculation performed by the navigation device 2 and the result of route calculation performed at the information center 3 may be identical to each other. However, as for the route between the passing point 2 and passing point 3, the results of route calculations performed by the navigation device 2 and the information center 3 respectively may be different from each other. A route indicated with a dashed line corresponds to the result of route calculation performed by the navigation device 2, and a route indicated with a solid line corresponds to the result of route calculation performed at the information center 3. The reason why the calculated routes are different from each other is conceivably that a new expressway, a new toll road, or a new tunnel has been constructed. Namely, map data used by the navigation device 2 in the vehicle is conceivably old and does not contain map data on the new expressway, new toll road, or new tunnel.

FIG. 4 lists the required times for driving between passing points which are calculated by the navigation device 2 in the vehicle and the required times for driving between passing points which are calculated at the information center 3.

FIG. 4 demonstrates that the required time for driving along the route from the passing point 2 to the passing point 3 which is calculated by the navigation device 2 is much longer, that is, route guidance cannot be appropriately achieved.

In this case, the operator tells the user of the vehicle through audio communication that route guidance cannot be appropriately achieved. Even when the operator tells that route guidance cannot be appropriately achieved, if the user of the vehicle confirms, i.e., verifies that the destination may be designated as a destination, simple guidance by the information center 3 is executed for the route for which route guidance cannot be appropriately achieved. The simple guidance is the guidance to be achieved by displaying or outputting by voice a guide message at each of the passing point 2 and passing point 3, or at each of points through which the user passes a little earlier than the user passes through the passing point 2 or passing point 3. Data required for executing the simple guidance for data of a guide message and data of positional information such as coordinates or the like on a point, at which the guide message is outputted, is transmitted from the information center 3 to the navigation device 2 at step S140 that will be described later. Preferably, if a decision is made that route guidance cannot be appropriately executed, a user can select whether the user has simple guidance executed until the user reaches a destination or the user has a detouring route, for which detailed guidance can be executed, designated, namely, the operator asks the user which of these options the user selects.

Thereafter, the procedure proceeds to step S120. A decision is made on whether the user of the vehicle has responded that the user may set the destination designated as a destination. If the user has responded that the user may set the destination designated as a destination, the procedure proceeds to step S130. The connection between the navigation device 2 in the vehicle and the information center 3 is changed to the connection for data communication. Thereafter, the procedure proceeds to step S140. Information on finalization of designation of a destination, and data, which is required for simple guidance in case the simple guidance need to be executed, i.e., data of a guide message and data of positional information such as coordinates or the like on a point, i.e., passing point or the like, at which the guide message is outputted, are transmitted from the information center 3 to the navigation device 2.

Thereafter, the procedure proceeds to step S150. If accounting arises, accounting is executed. Thereafter, the procedure proceeds to step S160. The communication line between the navigation device 2 and the information center 3 is disconnected.

Thereafter, the procedure proceeds to step S170. A decision or determination made on whether information on finalization of designation of a destination has been posted from the information center 3 to the navigation device 2. When the information on finalization of designation of the destination has been posted, the procedure proceeds to step S180. Since purchase of positional information on the destination or the like from the information center 3 is finalized, designation of the destination is finalized or completed. Route guidance along the calculated guide route is executed. Thereafter, route guidance is executed in the same manner as route guidance performed by a known navigation device. As route guidance for the route between the passing points 2 and 3 shown in FIG. 2, the aforesaid simple guidance is executed.

On the other hand, if it is found at step S170 that the information on finalization of designation of a destination is not posted, the procedure proceeds to step S190. The information on the destination received from the information center 3 is discarded, and destination designation processing is terminated.

If it is found at step S120 that the user has responded that the user does not want to have the received destination designated as a destination, the procedure proceeds to step S200. The user is inquired of about whether the user wants to reset destination designation executed again. If the user responds that the user wants to reset destination designation executed again, the procedure returns to step S10, and destination designation processing is repeated. On the other hand, if it is found at step S200 that the user has responded that the user does not reset destination designation executed again, the procedure proceeds to step S170. Since the information on finalization of designation of a destination is not posted, the procedure proceeds to step S190. The information on the destination received from the information center 3 is discarded, and the destination designation processing is terminated.

The first audio communication executed at step S30 and the second audio communication executed at step S100 will be described concretely. To begin with, a concrete example of audio communication will be described on the assumption that map data in the navigation device 2 in the user's vehicle is old and a road in the vicinity of a destination is not contained in the map data.

In this case, the first audio communication proceeds, for example, as mentioned below.

A user says, "I want to go to AAA. I want to designate a destination."

An operator asks, "The destination is AAA located in BBB city in CCC prefecture, isn't it?"

The user says, "That's right."

The operator says, "I'll verify whether your navigation device can guide you to the destination. Wait a minute, will you?"

Thereafter, when the steps S50 to S90 are executed, it is revealed that map in the navigation device 2 is old and a road in the vicinity of the destination is not contained in the map. The second audio communication proceeds, for example, as mentioned below.

The operator says, "I'm afraid that the map you are using does not contain the road in the vicinity of the destination. The navigation device can merely guide you to an intermediate point. May I designate the destination without any change?"

The user says, "If I go to a place near the destination, I shall notice a guideboard. So, will you designate the destination?"

The operator says, "Yes, I will. I will designate the destination."

"I recommend you to upgrade the version of the map to the latest one. Thank you for your using our service."

Next, a concrete example of audio communication will be described on the assumption that map data in the navigation device 2 in a user's vehicle is old and an intermediate route to a destination largely varies, as shown in FIG. 3.

In this case, the first audio communication will proceed as mentioned below.

A user says, "I want to go to DDD. I want to designate a destination."

An operator asks, "The destination is DDD located in EEE city in FFF prefecture, isn't it?"

The user says, "That's right."

The operator says, "I'll verify whether your navigation device can guide you to the destination. Wait a minute, will you?"

Thereafter, when the steps S50 to S90 are executed, it is revealed that the map in the navigation device 2 is old, that a new road is not contained in the map, and that an optimal route to the destination therefore largely varies. The second audio speed will proceed, for example, as mentioned below.

The operator says, "I'm afraid that the map you are using does not contain the GGG expressway. Your navigation device cannot therefore guide you along the optimal route."

"If we render you a guidance service along the road contained in your map, it takes X hours to reach the destination. If you drive along the GGG expressway, it takes Y hours."

"If you drive along the GGG expressway, while you are driving along the GGG expressway, we can render you a simple guidance service alone. Which of the routes shall I set for you?"

The user says, "Guide me along the route passing through the GGG expressway, will you?"

The operator says, "Yes, I will. I will designate the route passing through the GGG expressway."

"We can render you a normal guidance service until you reach the entrance of the GGG expressway and after you get out of the GGG expressway. While you are driving along the GGG expressway, you will be informed of only the name of a junction at which you get out of the expressway and a linear distance to the junction."

"Thank you for your using our service."

Now, a description will be made of a case where simple guidance is executed as the route guidance for the route between the passing points 2 and 3 shown in FIG. 3. When a user approaches the passing point 2, which is the leading point of a simple guidance zone between the passing points 2 and 3, while being separated therefrom by a set distance, the user is guided with a message saying, for example, "Enter Route IIIB at the intersection of IIIC and advance toward IIIA." Thereafter, the user drives along the route indicated with a solid line. When the user approaches the passing point 3 while being separated therefrom by the set distance, the user is guided with a message saying "Enter Route IIIB at the intersection of IIIE and advance toward IIID."

In the foregoing embodiment, when a decision is made on whether a user can be appropriately guided, a required time for driving between passing points which is calculated by the navigation device 2 in the vehicle is compared with a required time for driving between the passing points which is calculated at the information center 3. The deciding method is not limited to this one. Alternatively, a distance from a final guided point to a destination which is calculated by the navigation device 2 in the vehicle may be compared with a distance from the final guided point to the destination which is calculated at the information center 3. When the difference between the distances is equal to or larger than a set value, a decision may be made that route guidance cannot be appropriately executed.

Moreover, in the embodiment, when the required time for driving between passing points is calculated, traffic jam information is not taken into account but a vehicle velocity is set to an initial value thereof. Thus, an error between the result of calculation such as required time or distance performed by the navigation device 2 in a vehicle and the result of calculation such as required time or distance performed at the information center 3 can be diminished.

In the embodiment having the foregoing constitution, a user of a vehicle tells an operator at a communication center or an information center a desired destination through a communication unit. Positional information on the destination retrieved by accessing a database in the information center is transmitted to the navigation device in the vehicle. The navigation device designates the destination on the basis of the positional information on the destination received from the information center, executes route calculation, and transmits the result of the route calculation to the information center. In the information center, the destination is designated based on the retrieved positional information on the destination, and route calculation is performed. The result of the route calculation is compared with the result of the route calculation received from the navigation device. A decision is made on whether route guidance can be appropriately executed based on the result of the route calculation performed by the navigation device. According to this constitution, an event in which the navigation device cannot appropriately execute route guidance because map data is old can be detected. Consequently, as for a route portion for which route guidance cannot be appropriately executed, simple guidance may be executed based on the latest map data available in the information center. Eventually, route calculation and route guidance can be extremely appropriately executed for the route from a current location to a destination.

According to the embodiment, as the result of route calculation to be transmitted from the navigation device 2 to the information center 3, a required time for driving along the calculated route, specifically, a required time for driving between passing points, is transmitted. When the difference of the required time from a required time derived from the result of route calculation performed at the information center 3 is equal to or larger than a set value, a decision is made that route guidance cannot be appropriately executed. The decision that route guidance cannot be appropriately executed can be accurately and quickly made.

In this case, as the result of route calculation to be transmitted from the navigation device 2 to the information center 3, a distance from a final guided point to a destination may be transmitted. When the difference of the distance from a distance derived from the result of route calculation performed at the information center 3 is equal to or larger than the set value, a decision may be made that route guidance cannot be appropriately executed.

In the aforesaid embodiment, when a decision is made that route guidance cannot be appropriately executed, a user can select whether the user has simple guidance executed until the user reaches a destination or the user designates a detouring route for which detailed guidance can be achieved. The user will find it user-friendly.

According to the aforesaid embodiment, when a decision is made that route guidance cannot be appropriately executed, a user can select whether the user has a currently designated destination held intact or the user re-designates a destination. The user will find it user-friendly.

In the aforesaid embodiment, when a decision is made that route guidance cannot be appropriately executed, simple guidance can be executed until a user reaches a destination.

An alternative mode is not limited to this one. The latest map data required for route calculation may be transmitted from the information center 3 to the navigation device 2 so that the navigation device can execute route calculation and route guidance.

In the aforesaid embodiment, a user of a vehicle and an operator in the information center 3 have audio communication with each other, whereby the database 23 is accessed in order to retrieve data of a destination desired by the user. Instead, the server 22 recognizes the user's voice, whereby the data of the user-desired destination may be retrieved. Namely, the navigation system 1 may be constructed without any operator.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. A navigation system comprising:
an information center that is disposed outside of a vehicle;
a navigation device that is arranged in the vehicle, and communicates with the information center by data communication;
a communication unit that is arranged in the navigation device, and transmits information about a destination to the information center;
a center side transmission unit that is arranged in the information center, searches positional information of the destination in a database of the information center, and transmits the positional information to the navigation device;
a calculation unit that is arranged in the navigation device, sets the destination based on the positional information input from the information center, and calculates a first route to the destination;
a navigation side transmission unit that is arranged in the navigation device, transmits first route calculation result to the information center; and
a determination unit that is arranged in the information center, sets the destination based on the positional information, calculates a second route to the destination, compares second route calculation result with the first route calculation result input from the navigation device, and determines whether the navigation device can appropriately guide an optimum route to the destination based on the first or second route calculation result,
the information center is configured to specify a section between two adjacent passing points, at which the navigation device cannot appropriately guide the optimum route, when the determination unit determines that the navigation device cannot appropriately guide the optimum route to the destination,
the information center is configured to transmit data of a guide message and data of positional information to the navigation device in order to guide a new road in the second route at a specified section,
the information center is configured to calculate the new road and the new road is not stored in a database of the navigation device,
the data of the guide message being used for executing a simple guidance of a name of an intersection, a name of a road or a traveling direction,
the data of the positional information showing a position, at which the guide message is output,
the navigation device is configured to receive the data of the guide message and the data of the positional information, and
the navigation device is configured to execute the simple guidance based on the data of the guide message and the data of the positional information.

2. The navigation system according to claim 1,
wherein the first route calculation result includes a first distance between a current position of the vehicle and the destination,
wherein the second route calculation result includes a second distance between the current position of the vehicle and the destination, and
wherein the determination unit determines that the navigation device guides the route to the destination based on the second route calculation result when a difference between the first distance and the second distance is larger than a predetermined value.

3. The navigation system according to claim 1,
wherein the first route calculation result includes a first travel time from a current position of the vehicle to the destination,
wherein the second route calculation result includes a second travel time from the current position of the vehicle to the destination, and
wherein the determination unit determines that the navigation device guides the route to the destination based on the second route calculation result when a difference between the first travel time and the second travel time is larger than a predetermined value.

4. The navigation system according to claim 1,
wherein the navigation device guides the route to the destination based on information input from the information center when the determination unit determines that the navigation device guides the route to the destination based on the second route calculation result,
wherein the navigation device guides the route to the destination based on information stored in the navigation device when the determination unit determines that the navigation device guides the route to the destination based on the first route calculation result,
wherein the information stored in the navigation device provides further information than the information input from the information center,
wherein the navigation device inputs whether an user of the navigation device selects the first route calculation result or the second route calculation result, and
wherein the navigation device guides the route based on the first route calculation result when the user selects the first route calculation result and even when the determination unit determines that the navigation device should guide the route to the destination based on the second route calculation result.

5. The navigation system according to claim 1,
wherein the navigation device inputs whether an user of the navigation device resets the destination when the determination unit determines that the navigation device should guides the route to the destination based on the second route calculation result.

6. The navigation system of claim 1, the navigation device being configured to:
provide a guidance route to the destination based on a route calculation using map data stored in the navigation device instead of by executing the simple guidance, when the determination unit determines that the navigation device can appropriately guide the optimum route to the destination.

7. The navigation system of claim 6, the navigation device being configured to display or output the guide message at the two adjacent passing points, instead of providing the guidance route to the destination based on the route calculation using the map data stored in the navigation device, when the determination unit determines that the navigation device cannot appropriately guide the optimum route to the destination.

8. The navigation system of claim 1, the navigation device being configured to display or output the guide message at the two adjacent passing points, instead of providing a guidance route to the destination based on a route calculation using map data stored in the navigation device, when the determination unit determines that the navigation device cannot appropriately guide the optimum route to the destination.

9. A method for navigating route to a destination comprising:
- transmitting information about the destination from a navigation device in a vehicle to an external information center;
- calculating a first route from a current position of the vehicle to the destination by the navigation device;
- transmitting first route calculation result from the navigation device to the information center;
- calculating a second route from the current position of the vehicle to the destination by a server in the information center;
- comparing second route calculation result with the first route calculation result by using the server;
- determining whether the navigation device can appropriately guide an optimum route to the destination based on the first or second route calculation result;
- specifying a section between two adjacent passing points, at which the navigation device cannot appropriately guide the optimum route, when it is determined that the navigation device cannot appropriately guide the optimum route to the destination;
- transmitting data of a guide message and data of positional information to the navigation device in order to guide a new road in the second route at a specified section,
- the new road being calculated by the information center and not stored in a database of the navigation device,
- the data of the guide message being used for executing a simple guidance of a name of an intersection, a name of a road or a traveling direction,
- the data of the positional information showing a position, at which the guide message is output,
- the navigation device receiving the data of the guide message and the data of the positional information,
- the navigation device executing the simple guidance based on the data of the guide message and the data of the positional information,
- the first route calculation result including a first travel time from the current position of the vehicle to the destination,
- the second route calculation result including a second travel time from the current position of the vehicle to the destination, and
- the determination unit determining that the navigation device guides the route to the destination based on the second route calculation result when a difference between the first travel time and the second travel time is larger than a predetermined value.

10. The method of claim 9, further comprising:
the navigation device providing a guidance route to the destination based on a route calculation using map data stored in the navigation device instead of by executing the simple guidance, when the determination unit determines that the navigation device can appropriately guide the optimum route to the destination.

11. The method of claim 10, further comprising:
the navigation device displaying or outputting the guide message at the two adjacent passing points, instead of providing the guidance route to the destination based on the route calculation using the map data stored in the navigation device, when the determination unit determines that the navigation device cannot appropriately guide the optimum route to the destination.

12. The method of claim 9, further comprising:
the navigation device displaying or outputting the guide message at the two adjacent passing points, instead of providing a guidance route to the destination based on a route calculation using map data stored in the navigation device, when the determination unit determines that the navigation device cannot appropriately guide the optimum route to the destination.

* * * * *